(12) United States Patent
Terakawa

(10) Patent No.: US 7,760,940 B2
(45) Date of Patent: Jul. 20, 2010

(54) METHOD, APPARATUS, AND PROGRAM FOR DETECTING OBJECTS IN DIGITAL IMAGE

(75) Inventor: Kensuke Terakawa, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 1015 days.

(21) Appl. No.: 11/500,982

(22) Filed: Aug. 9, 2006

(65) Prior Publication Data

US 2007/0036431 A1    Feb. 15, 2007

(30) Foreign Application Priority Data

Aug. 9, 2005   (JP)   ............................. 2005-230704

(51) Int. Cl.
G06K 9/00   (2006.01)
G06K 9/62   (2006.01)

(52) U.S. Cl. ........................ 382/170; 382/103; 382/115; 382/155; 382/159; 382/160; 382/181

(58) Field of Classification Search ................. 382/103, 382/115, 117, 118, 155, 157, 159, 160, 170, 382/181, 192

See application file for complete search history.

(56) References Cited

U.S. PATENT DOCUMENTS

| 4,323,880 | A | * | 4/1982 | Lucas | 382/170 |
|---|---|---|---|---|---|
| 4,972,193 | A | * | 11/1990 | Rice | 342/90 |
| 5,446,543 | A | * | 8/1995 | Nakagawa et al. | 356/405 |
| 6,154,559 | A | * | 11/2000 | Beardsley | 382/103 |
| 6,675,174 | B1 | * | 1/2004 | Bolle et al. | 707/104.1 |
| 6,754,367 | B1 | * | 6/2004 | Ito et al. | 382/103 |
| 6,865,295 | B2 | * | 3/2005 | Trajkovic | 382/170 |
| 7,123,754 | B2 | * | 10/2006 | Matsuo et al. | 382/118 |
| 2002/0102024 | A1 | | 8/2002 | Jones et al. | |
| 2005/0129276 | A1 | * | 6/2005 | Haynes et al. | 382/103 |
| 2005/0180639 | A1 | * | 8/2005 | Trifonov et al. | 382/225 |
| 2006/0140455 | A1 | * | 6/2006 | Costache et al. | 382/118 |

OTHER PUBLICATIONS

Oja, Erkki, and Kimmo Valkealahti. "Co-occurrence map : Quantizing multidimensional texture histograms." Pattern Recognition Letters 17(1996): 723-730. Print.*
Chapelle, Olivier, Patrick Haffner, and Vladimir Vapnik. "SVMs for Histogram-Based Image Classification." IEEE Transactions on Neural Networks 3(1999): 1-11. Print.*

* cited by examiner

Primary Examiner—Matthew C Bella
Assistant Examiner—Michael A Newman
(74) Attorney, Agent, or Firm—Sughrue Mion, PLLC

(57) ABSTRACT

In a method of detection of different objects in an input image by application, to partial images cut at different positions in the input image, of a plurality of weak classifiers that evaluate whether a detection target image is an image of a predetermined object based on a histogram of values of characteristic quantities calculated from a plurality of sample images representing the predetermined object, the histogram is extended to multi-dimensions and a criterion for the evaluation by the weak classifiers is a multi-dimensional histogram representing histograms for the different objects in the form of vectors.

12 Claims, 11 Drawing Sheets

FIG.5
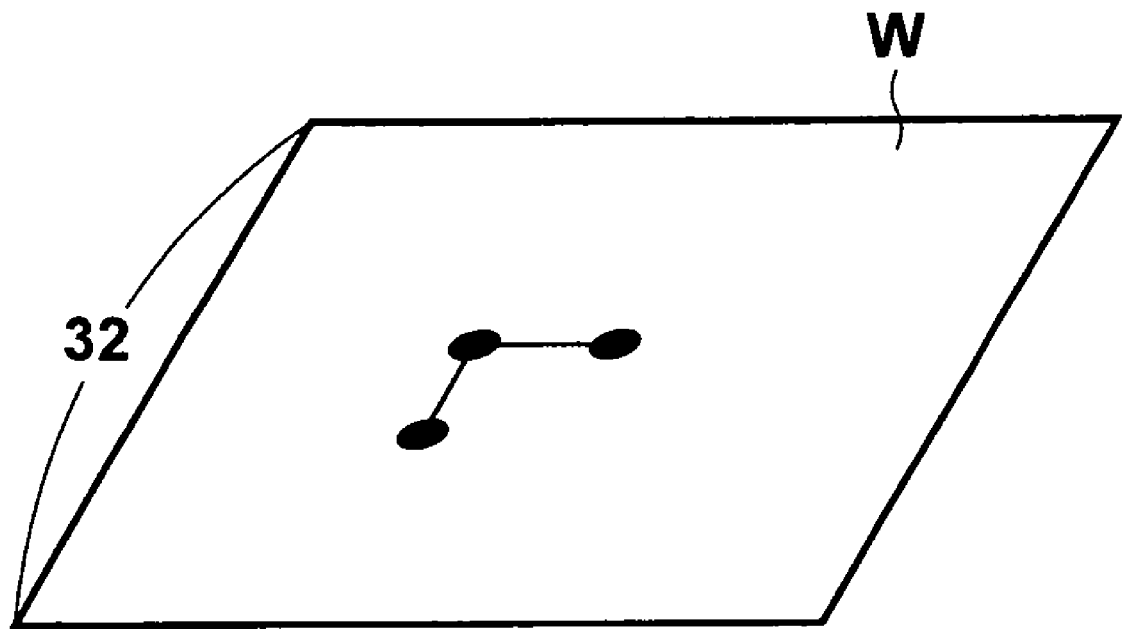
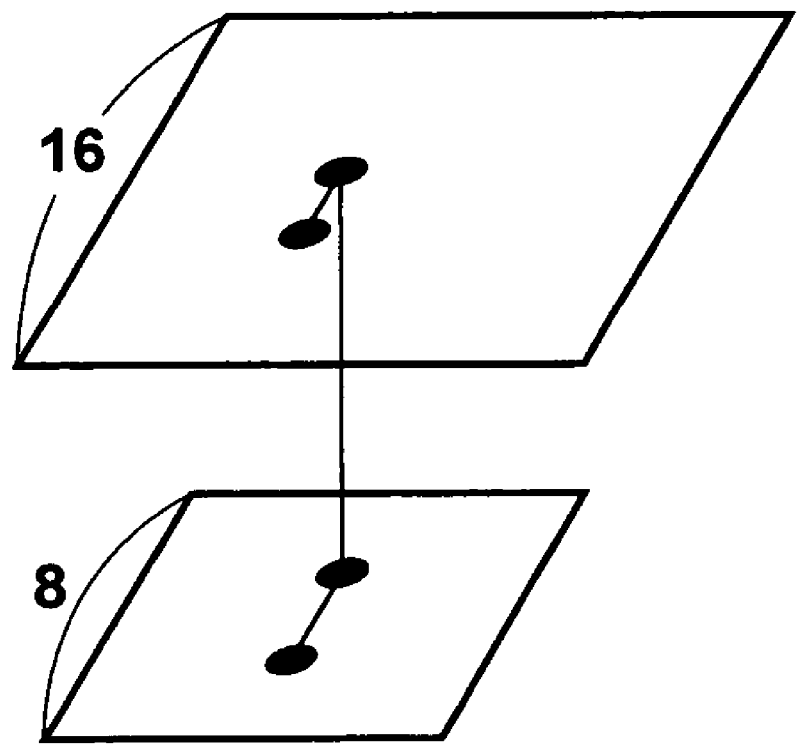

FIG.11
IMAGES REPRESENTING FRONT-VIEW FACES
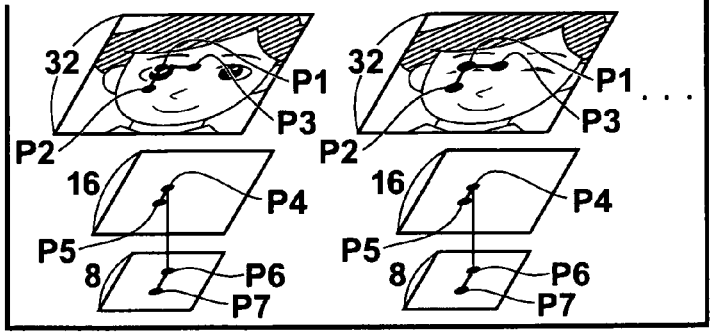
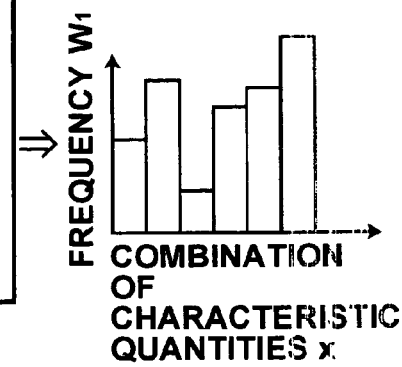
IMAGES REPRESENTING PROFILES
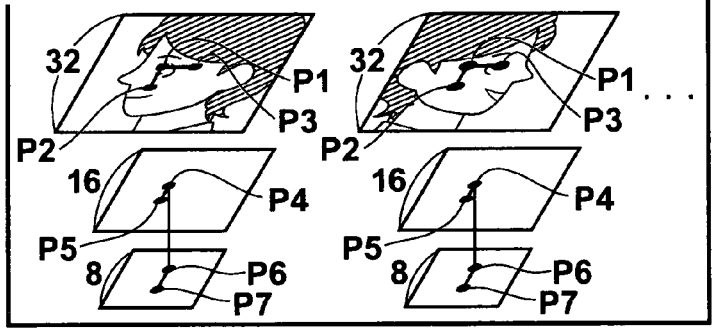
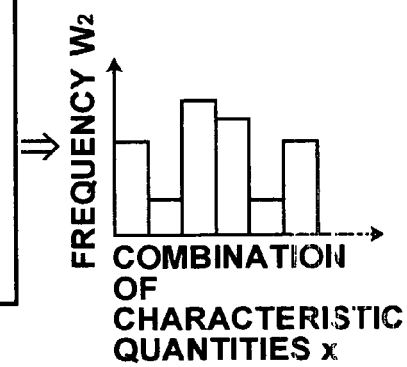
IMAGES REPRESENTING NON-FACES
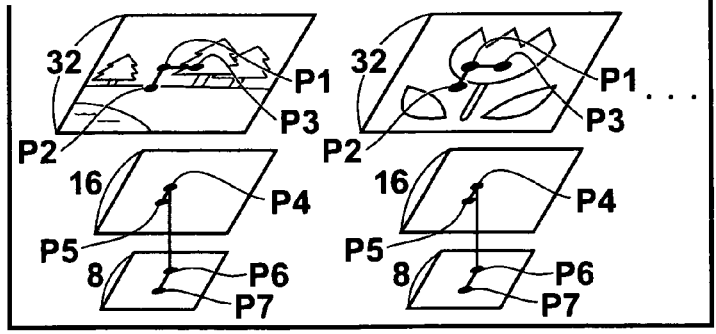
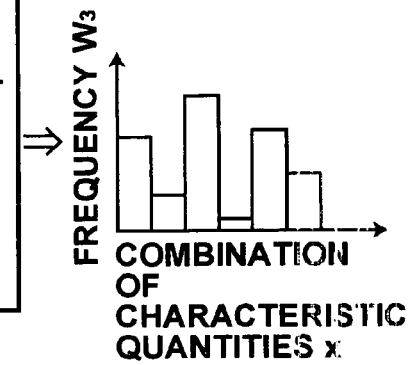

METHOD, APPARATUS, AND PROGRAM FOR DETECTING OBJECTS IN DIGITAL IMAGE

BACKGROUND OF THE INVENTION

1. Field of the Invention

The present invention relates to a method and an apparatus for detecting different objects in a digital image. The present invention also relates to a program therefore.

2. Description of the Related Art

Various kinds of methods have been proposed for detecting a predetermined object such as a face in a digital image such as a general photograph by using a computer or the like. As a method of detection for such an object is known a method by template matching that has been used from comparatively early days. In addition is known a method using learning by so-called boosting that recently attracts attention (see U.S. Patent Application Publication No. 20020102024).

In a method using learning by boosting, a detector that can judge whether an image represents a predetermined object is prepared by causing the detector to learn characteristics of the predetermined object based on a plurality of sample images representing the predetermined object and a plurality of sample images that do not represent the predetermined object. Partial images are sequentially cut from a detection target image in which the predetermined object is to be detected, and the detector judges whether each of the partial images is an image representing the predetermined object. In this manner, the predetermined object is detected in the detection target image.

The detector comprises a plurality of weak classifiers that judge whether the image represents the predetermined object based on characteristic quantities of the image. The weak classifiers are selected from a plurality of weak classifiers based on the learning. Each of the weak classifiers has a specific algorithm for calculating the characteristic quantities. Bases for judgment criterion therefore are a first histogram $W1(x)$ representing a relationship between values of the calculated characteristic quantities and frequency values thereof generated from sample images representing the detection target object, and a second histogram $W2(x)$ representing the same relationship generated from sample images representing objects other than the detection target object, as shown in FIG. 9. The judgment criterion is a histogram represented by $h(x)=(W1(x)-W2(x))/(W1(x)+W2(x))$, as shown in FIG. 10. More specifically, when the characteristic quantities are calculated for an unknown input image, a probability of the input image being the detection target object is known based on whether the frequency value corresponding to the characteristic quantities is positive or negative in the histogram h (x), and based on magnitude of the absolute value thereof. For example, in the case where the frequency value is a positive value, the probability becomes higher as the magnitude of the absolute value thereof becomes larger. On the contrary, a probability of the input image being an image representing an object other than the detection target object becomes higher as the magnitude of the absolute value thereof becomes larger in the case where the frequency value is negative. Each of the weak classifiers calculates a score representing the probability of the input image being the detection target object, based on the histogram. By evaluating the scores calculated by the weak classifiers, whether the input image is an image of the detection target object can be judged.

A method of this type is effective for solving a 2-class problem such as detection of face by judging whether an image represents a face or a non-face object. Especially, the method using learning by boosting can achieve fast and high-performance detection, and is used widely in various fields in addition to a technique similar thereto.

However, for detecting a plurality of objects in an image by using the above-described method of learning by boosting, images need to be classified into 3 or more types, and the same number of detectors as the number of the types are necessary. For example, in the case where a face in an arbitrary direction is to be detected in an image, the directions of face need to be categorized and face detection needs to be carried out for each of the face directions. In the case where an occluded face and a face photographed in underexposure are also to be detected, face detection needs to be carried out therefore. Consequently, an increase in the number of detectors is expected, which leads to more time-consuming learning and detection. Therefore, detection is not carried out efficiently. Furthermore, a problem seems to occur on difference in judgment criteria between the detectors.

SUMMARY OF THE INVENTION

The present invention has been conceived based on consideration of the above circumstances. An object of the present invention is therefore to provide a method, an apparatus, and a program for efficiently detecting a plurality of target objects in a digital image.

A method of objects detection of the present invention is a method of detecting different objects in an input image, and the method comprises the steps of:

preparing a plurality of weak classifiers each of which selects a vector in an N−1 (N≧3) dimensional histogram, the vector corresponding to values of characteristic quantities related to distribution of luminance calculated from each of partial images of a predetermined size cut from the input image, the N−1 dimensional histogram generated by:

obtaining N histograms of values of the characteristic quantities for predetermined objects of N types through calculation of the characteristic quantities for each of the N types from different sample images representing the predetermined objects;

converting values of frequency in the respective N histograms into vectors by linearly combining the values of frequency with predetermined N basis vectors corresponding to the N histograms one to one, the basis vectors having the same magnitude and isotropy in an N−1 dimensional space; and obtaining the (N−1) dimensional histogram by combining the vectors of frequency for the values of the characteristic quantities corresponding to each other between the N histograms;

cutting the partial images of the predetermined size at different positions in the input image; and carrying out judgment as to which one of the N types of the predetermined objects each of the partial images represents by:

combining the vector or vectors selected by at least one of the weak classifiers by applying the classifier or classifiers on each of the partial images;

extracting components of the basis vectors of the combined vector as scores respectively representing probabilities of the corresponding partial image being the predetermined objects of the N types corresponding to the basis vectors; and carrying out the judgment based on magnitude of the scores.

In the method of objects detection of the present invention, the weak classifiers may be connected serially, and the step of carrying out the judgment may be the step of judging that each of the partial images represents one of the predetermined objects by:

adding the vectors selected by the weak classifiers by sequentially applying the weak classifiers from the first classifier to each of the partial images; and judging each of the partial images being an image of the predetermined object corresponding to one of the scores extracted according to the combined vector in the case where the score exceeds a predetermined threshold value.

In the method of objects detection in the present invention, the weak classifiers may have been selected from a plurality of weak classifiers according to a method of learning by boosting.

In the method of objects detection in the present invention, the weak classifiers may be connected in order determined according to the method of learning by boosting.

An apparatus of objects detection of the present invention is an apparatus for detecting different objects in an input image, and the apparatus comprises:

a plurality of weak classifiers each of which selects a vector in an N−1 (N≧3) dimensional histogram, the vector corresponding to values of characteristic quantities related to distribution of luminance calculated from each of partial images of a predetermined size cut from the input image, the N−1 dimensional histogram generated by:

obtaining N histograms of values of the characteristic quantities for predetermined objects of N types through calculation of the characteristic quantities for each of the N types from different sample images representing the predetermined objects;

converting values of frequency in the respective N histograms into vectors by linearly combining the values of frequency with predetermined N basis vectors corresponding to the N histograms one to one, the basis vectors having the same magnitude and isotropy in an N−1 dimensional space; and obtaining the (N−1) dimensional histogram by combining the vectors of frequency for the values of the characteristic quantities corresponding to each other between the N histograms;

partial image cutting means for cutting the partial images of the predetermined size at different positions in the input image; and judgment means for carrying out judgment as to which one of the N types of the predetermined objects each of the partial images represents by:

combining the vector or vectors selected by at least one of the weak classifiers by applying the classifier or classifiers on each of the partial images;

extracting components of the basis vectors of the combined vector as scores respectively representing probabilities of the corresponding partial image being the predetermined objects of the N types corresponding to the basis vectors; and carrying out the judgment based on magnitude of the scores.

In the apparatus of objects detection of the present invention, the weak classifiers may be connected serially, and the judgment means may judge that each of the partial images represents one of the predetermined objects by:

adding the vectors selected by the weak classifiers by sequentially applying the weak classifiers from the first classifier to each of the partial images; and judging each of the partial images being an image of the predetermined object corresponding to one of the scores extracted according to the combined vector in the case where the score exceeds a predetermined threshold value.

In the apparatus of objects detection in the present invention, the weak classifiers may have been selected from a plurality of weak classifiers according to a method of learning by boosting.

In the apparatus of objects detection in the present invention, the weak classifiers may be connected in order determined according to the method of learning by boosting.

A program of the present invention is a program for causing a computer to function as means of objects detection for detecting different objects in an input image, and the program causes the computer to function as:

a plurality of weak classifiers each of which selects a vector in an N−1 (N≧3) dimensional histogram, the vector corresponding to values of characteristic quantities related to distribution of luminance calculated from each of partial images of a predetermined size cut from the input image, the N−1 dimensional histogram generated by:

obtaining N histograms of values of the characteristic quantities for predetermined objects of N types through calculation of the characteristic quantities for each of the N types from different sample images representing the predetermined objects;

converting values of frequency in the respective N histograms into vectors by linearly combining the values of frequency with predetermined N basis vectors corresponding to the N histograms one to one, the basis vectors having the same magnitude and isotropy in an N−1 dimensional space; and obtaining the (N−1) dimensional histogram by combining the vectors of frequency for the values of the characteristic quantities corresponding to each other between the N histograms;

partial image cutting means for cutting the partial images of the predetermined size at different positions in the input image; and judgment means for carrying out judgment as to which one of the N types of the predetermined objects each of the partial images represents by:

combining the vector or vectors selected by at least one of the weak classifiers by applying the classifier or classifiers on each of the partial images;

extracting components of the basis vectors of the combined vector as scores respectively representing probabilities of the corresponding partial image being the predetermined objects of the N types corresponding to the basis vectors; and carrying out the judgment based on magnitude of the scores.

In the program of the present invention, the weak classifiers may be connected serially, and the judgment means may judge that each of the partial images represents one of the predetermined objects by:

adding the vectors selected by the weak classifiers by sequentially applying the weak classifiers from the first classifier to each of the partial images; and judging each of the partial images being an image of the predetermined object corresponding to one of the scores extracted according to the combined vector in the case where the score exceeds a predetermined threshold value.

In the program of the present invention, the weak classifiers may have been selected from a plurality of weak classifiers according to a method of learning by boosting.

In the program of the present invention, the weak classifiers may be connected in order determined according to the method of learning by boosting.

The present invention extends a method of GentleAdaBoost to a detector that detects a plurality of objects. Hereinafter is described review of the nature of a current histogram for a weak classifier and extension thereof to a plurality of objects.

Agreement and difference are described below between equations of weights (scores) of histograms in methods of log-likelihood and GentleAdaBoost.

In the case where the method of log-likelihood is used, the weights of histograms are given by the following equation:

$$y_{log} = \frac{1}{2}\log(W_+/W_-) \qquad (1)$$

Meanwhile, the weights of histograms in GentleAdaBoost is given by the following equation:

$$y_{Gen} = (W_+ - W_-)/(W_+ + W_-) \qquad (2)$$

By transforming Equation (1), the following equation is obtained:

$$\begin{aligned} y_{log} &= \frac{1}{2}\log\left(\frac{W_+}{W_-}\right) \\ &= \frac{1}{2}\log\left(\frac{W_+/(W_+ + W_-)}{W_-/(W_+ + W_-)}\right) \\ &= \frac{1}{2}\log\left(\frac{W_+}{W_+ + W_-}\right) - \frac{1}{2}\log\left(\frac{W_-}{W_+ + W_-}\right) \end{aligned} \qquad (1)'$$

Transforming Equation (2) also leads to the following equation:

$$\begin{aligned} y_{Gen} &= \frac{W_+ - W_-}{W_+ + W_-} \\ &= \frac{W_+}{W_+ + W_-} - \frac{W_-}{W_+ + W_-} \end{aligned} \qquad (2)'$$

Equations (1)' and (2)' are both expressed as subtraction between 2 terms. However, logarithms are used for the terms in Equation (1)' but not in Equation (2)'. Since each of the terms described above takes a value ranging from 0 to 1, it may be thought that Equation (1)' exponentially emphasizes a change in the value calculated by Equation (2)'.

Note that both equations (1)' and (2)' become 0 when W+=W−. This fact implies that judgment cannot be made as a result of judgment on training data in the case where the number of faces is the same as the number of non-face subjects. Usage of logarithms may merely represent a different manner of weighting in the case where W+=W− is not satisfied.

By comparing Equations (1) and (2), the fact has been obtained that the weights become 0 in the case where W+=W−. In reverse, extension of the concept of histogram to dealing with a plurality of objects is described below, based on a quantity that becomes 0 in the case where the quantities of respective objects are the same as a result of judgment (3).

For the sake of simpler description, 3 objects (a front-view face, a profile, and a non-face subject) are considered. Weights therefore are W1, W2, and W3, respectively. By applying this case to the condition (3) above, the condition (3) is rewritten as:

a quantity that becomes 0 in the case where W1=W2=W3 as a result of judgment.

Such a quantity can be realized by using position vectors (that is, basis vectors) of 3 vertices of an equilateral triangle whose center of mass is located at the origin (see FIG. 14). More specifically, if W1=W2=W3, W1<e1>+W2<e2>+W3<e3>=(0,0). Basis vectors are arbitrary in terms of positions and magnitude thereof. Let the magnitude of the basis vectors be 1. Locate one of the basis vectors on the X axis. Using this vector as the basis vector for an object in the background (such as a non-face subject) is convenient for cascading. The basis vectors <e1>, <e2>, and <e3> satisfy the following equations:

$$\vec{e_1} + \vec{e_2} + \vec{e_3} = \vec{0} \qquad (4\text{-}1)$$

$$\vec{e_i} \cdot \vec{e_j} = \begin{cases} 1, & i = j \\ -\frac{1}{2}, & i \neq j \end{cases} \qquad (4\text{-}2)$$

$$\vec{e_j} \cdot (\vec{e_j} - \vec{e_k}) = 0 \qquad (4\text{-}3)$$

Equation (4-1) describes the condition (3) for detector generation. Equation (4-2) describes isotropy of the basis vectors, that is, each of the basis vectors becomes the same weight for either one of the remaining basis vectors. Equation (4-3) describes that a difference between 2 of the basis vectors (corresponding to a side) is perpendicular to the remaining basis vector.

By using this method, the histogram can be expanded two-dimensionally. For this reason, a judgment score is a two-dimensional vector <s> having 2 components (see FIG. 15). At this time, a score SCi for each of the objects is given by an inner product of the score vector <s> and the basis vector <ei> therefore (see FIG. 2, Equation (5)).

$$SC_i = \vec{s} \cdot \vec{e_i} \qquad (5)$$

This idea described above can be extended easily to a 3 (or more) body problem. More specifically, in order to apply to an N-body problem, position vectors of vertices of the simplest regular convex polyhedron (a simplex) whose center of mass is located at the origin in an N dimensional space are used as the basis vectors. A simplex is a geometric figure, and is a regular polyhedron comprising N+1 points (vertices) and sides and faces connecting the vertices in an N−1 dimensional space (Numerical Recipes in C in Japanese Version pp. 295). Equations (4-1) to (4-3) are generalized as follows when <e1>, <e2>, . . . , <en> denote the basis vectors:

$$\sum_{i=1}^{N} \vec{e_i} = \vec{0} \qquad (6\text{-}1)$$

$$\vec{e_i} \cdot \vec{e_j} = \begin{cases} 1, & i = j \\ -\frac{1}{N-1}, & i \neq j \end{cases} \qquad (6\text{-}2)$$

$$\vec{e_i} \cdot (\vec{e_j} - \vec{e_k}) = 0 \qquad (6\text{-}3)$$

Examples of the basis vectors for the cases of 2-body problem to 5-body problem are shown below. Even in the case where the number of dimensions increases, the basis vectors can be found mechanically according to a simple algorithm:

2-body(1-dimensional): (1)(−1)  (7-1)

3-body(2-dimensional): $(1,0)\left(-\frac{1}{2}, \frac{\sqrt{3}}{2}\right)\left(-\frac{1}{2}, -\frac{\sqrt{3}}{2}\right)$  (7-2)

4-body(3-dimensional):  (7-3)

$(1,0,0)\left(-\frac{1}{3}, \frac{2\sqrt{2}}{3}, 0\right)\left(-\frac{1}{3}, -\frac{\sqrt{2}}{3}, \frac{\sqrt{6}}{3}\right)\left(-\frac{1}{3}, -\frac{\sqrt{2}}{3}, -\frac{\sqrt{6}}{3}\right)$ 5-body(4-dimensional): (1,0,0,0)  (7-4)

$\left(-\frac{1}{4}, \frac{\sqrt{15}}{4}, 0, 0\right)\left(-\frac{1}{4}, -\frac{\sqrt{15}}{12}, \frac{\sqrt{30}}{6}, 0\right)$ $\left(-\frac{1}{4}, -\frac{\sqrt{15}}{12}, \frac{\sqrt{30}}{6}, \frac{\sqrt{10}}{4}\right)\left(-\frac{1}{4}, -\frac{\sqrt{15}}{12}, -\frac{\sqrt{30}}{12}, -\frac{\sqrt{10}}{4}\right)$ Based on the consideration described above, in the case where N objects (N≧3) are to be detected, a multi-dimensional histogram <h(x)> is generated according to the following equation as a criterion for a weak classifier, by using position vectors <ei> of N vertices of a regular convex polyhedron whose center of mass is located at the origin in an N−1 dimensional space:

$$\vec{h}(x) = \frac{\sum_{i=1}^{N} W_i(x)\vec{e_i}}{\sum_{i=1}^{N} W_i(x)}$$

$\|\vec{e_i}\| = 1, \; i=1,\cdots,N \quad \vec{e_i}\cdot\vec{e_j} = \begin{cases} 1, & i=j \\ -\frac{1}{N-1}, & i \neq j \end{cases}$ $\sum_{i=1}^{N} \vec{e_i} = \vec{0} \quad \vec{e_i}\cdot(\vec{e_j} - \vec{e_k}) = 0$  (8)

The detector is trained in the following manner.

Assume that combinations (x1, <e1>), ..., (xM, <eM>) of characteristic quantities xi and the basis vectors <ei> respectively corresponding to the correct answers therefore are given for each of M sample images (where <ei> is any one of <e1>, <e2>, ..., <eN>).

Firstly, a weight for each of the sample images is initialized:

$w_1(i) = 1/M$  (9)

The following routine is then executed:
for k=1 to k max $$\vec{h_k}(x) = \underset{h_k(x)\in H}{\operatorname{argmin}} \left( \sum_{i=1}^{M} w_k(i)\exp\left(\max_{j\neq i}\left(\vec{h_k}(x_i)\cdot\vec{e_j}\right) - \vec{h_k}(x_i)\cdot\vec{e_i}\right)\right)$$  (10)

(a weak classifier hk(x) performs learning based on the weight wk(i))

$$w_{k+1} = \frac{w_k(i)\exp\left(\max_{j\neq i}\left(\vec{h_k}(x_i)\cdot\vec{e_j}\right) - \vec{h_k}(x_i)\cdot\vec{e_i}\right)}{\sum_{i=1}^{M}\left(w_k(i)\exp\left(\max_{j\neq i}\left(\vec{h_k}(x_i)\cdot\vec{e_j}\right) - \vec{h_k}(x_i)\cdot\vec{e_i}\right)\right)}$$  (11)

(update the weight)

end $\max_{j\neq i}\left(\left(\sum_{k=1}^{K}\vec{h_k}(x_i)\right)\cdot\vec{e_j}\right) < \left(\sum_{k=1}^{K}\vec{h_k}(x_i)\right)\cdot\vec{e_i}$ or $k = k_{max}$  (12)

(end the routine if either one of the conditions above is satisfied)

According to the method, the apparatus, and the program of the present invention for detecting objects in a digital image, in the method of detecting a target object in an input image by judging whether each of partial images cut at a different position in the input image represents a predetermined object by use of the weak classifiers that evaluate whether a detection target image is an image representing the predetermined object based on the histogram of the values of the characteristic quantities calculated from the sample images representing the predetermined object, the histogram is extended to multi-dimensions. The criteria for the weak classifiers for the evaluation are therefore the multi-dimensional histogram representing the histograms of the different objects in the form of vectors. Consequently, by evaluating the direction and magnitude of the vector in the multi-dimensional histogram corresponding to the values of the characteristic quantities calculated from each of the partial images, which of the objects the corresponding partial image represents can be judged at once. In this manner, the objects can be detected by cutting the partial images from the input image and by carrying out the judgment thereon while scanning the input image only once. Consequently, detection of the objects can be carried out efficiently.

BRIEF DESCRIPTION OF THE DRAWINGS

FIG. 5 is a drawing for explaining calculation of characteristic quantities in a weak classifier;

FIG. 11 shows how histograms are generated for respective types of sample images;

DESCRIPTION OF THE PREFERRED EMBODIMENT

Hereinafter, an embodiment of the present invention is described. The embodiment is a face detection system adopting the method of the present invention for detecting objects, and detects a face in a digital image regardless of a direction (out-plane direction), a position, a size, and a direction of rotation (orientation; in-plane direction) thereof.

Figure 1:
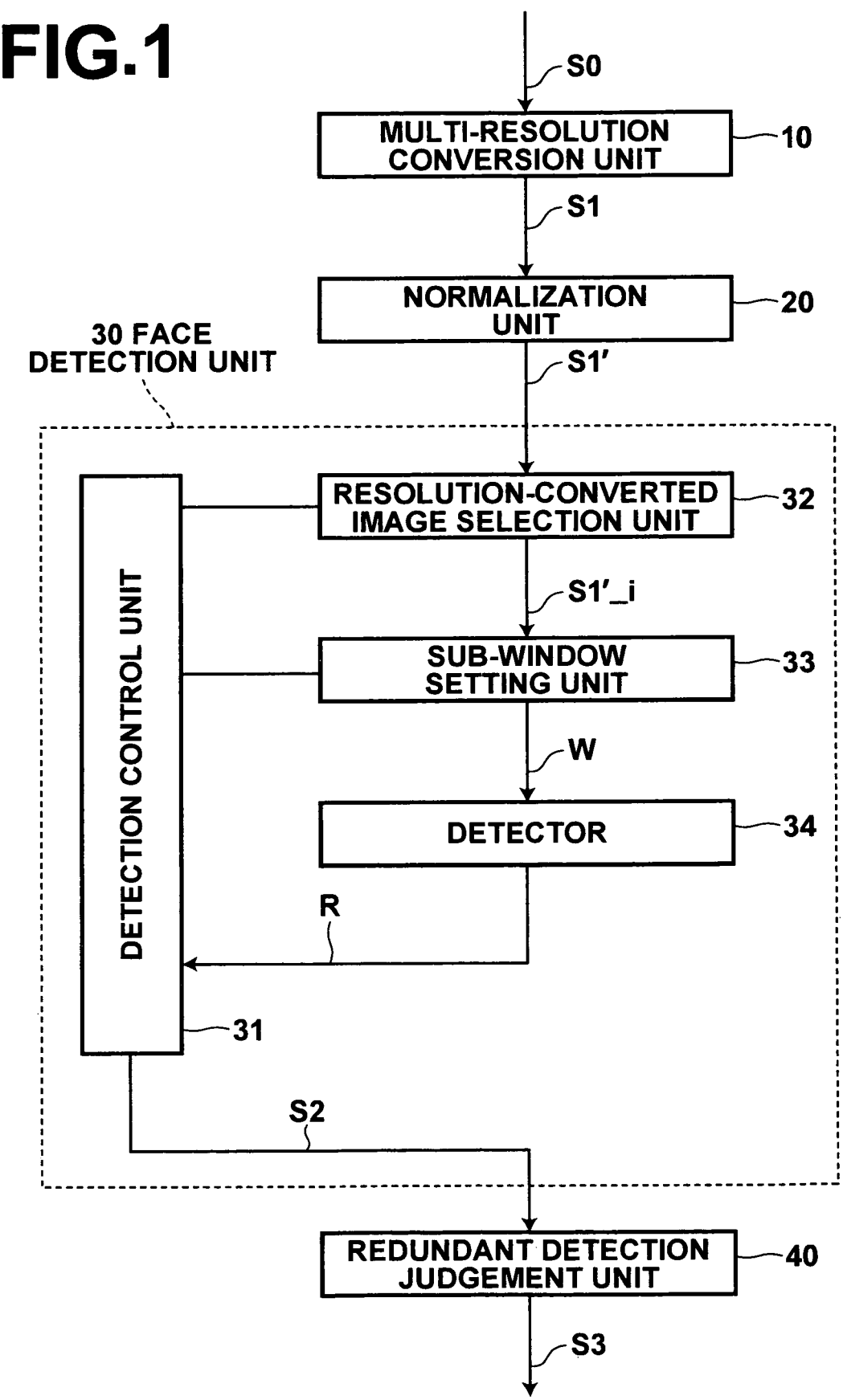
FIG. 1 is a block diagram showing the configuration of a face detection system.

FIG. 1 is a block diagram showing the configuration of a face detection system 1. As shown in FIG. 1, the face detection system 1 comprises a multi-resolution conversion unit 10, a normalization unit 20, a face detection unit 30, and a redundant detection judgment unit 40. The multi-resolution conversion unit 10 obtains a resolution-converted image group S1 (=S1_1, S1_2, . . . , S1_n) comprising images in different resolutions (hereinafter referred to as resolution-converted images) by carrying out multi-resolution conversion on an input image S0 to be subjected to face detection. The normalization unit 20 obtains a normalized resolution-converted image group S1' (=S1'_1, S1' 2, . . . , S1'1_n) by carrying out normalization on each of the resolution converted images in the resolution-converted image group S1 for converting pixel values thereof so that the resolution-converted images become images of luminance gradation suitable for face detection processing that will be described later. The face detection unit 30 detects an image representing a face (hereinafter referred to as a face image S2) in each of the resolution-converted images in the image group S1' by carrying out the face detection processing thereon. The redundant detection judgment unit 40 obtains a face image S3 without redundant face detection by judging whether the same face has been detected as the face images S2 in the resolution-converted images, based on a position thereof.

Figure 2:
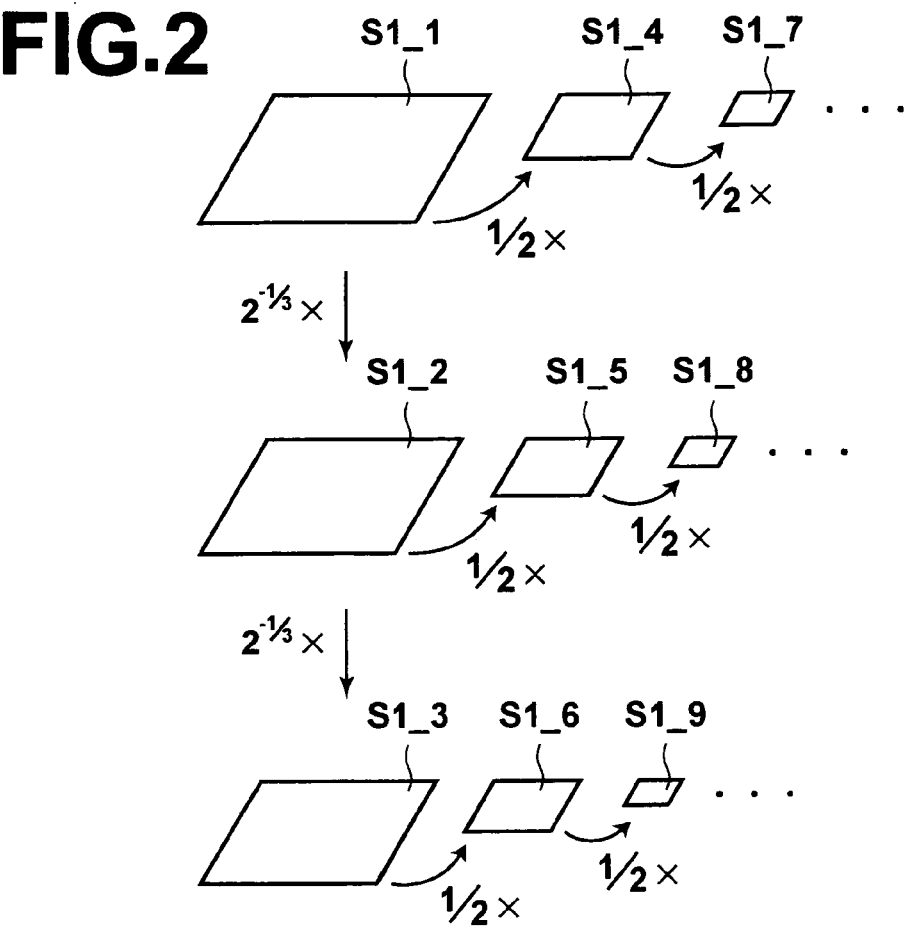
FIG. 2 shows a process of multi-resolution conversion of a detection target image.

The multi-resolution conversion unit 10 obtains a normalized input image S0' by normalizing the input image S0 into a predetermined resolution (image size) such as a rectangular image whose shorter sides respectively have 416 pixels, through conversion of the resolution of the input image S0. By further carrying out the resolution conversion on the normalized input image S0', the multi-resolution conversion unit 10 generates the resolution-converted images in the different resolutions, for obtaining the resolution-converted image group S1. The resolution-converted image group S1 is generated for the following reason. A size of a face included in an input image is generally unknown. However, a size of face (image size) to be detected is fixed to a predetermined size, in relation to a detector generation method that will be described later. Therefore, in order to detect faces in various sizes, partial images of a predetermined size are cut sequentially in each of the resolution-converted images while positions of the partial images are shifted therein. Whether each of the partial images is a face image or a non-face image is then judged. More specifically, as shown in FIG. 2, the normalized input image S0' is used as the resolution-converted image S1_1. Based on the resolution-converted image S1_1 is generated the resolution-converted image S1_2 in the size of 2 to the power of $-\frac{1}{3}$ of the resolution-converted image S1_1. Based on the resolution-converted image S1_2 is generated the resolution-converted image S1_3 in the size of 2 to the power of $-\frac{1}{3}$ of the resolution-converted image S1_2 (that is, in the size of 2 to the power of $-\frac{2}{3}$ of the resolution-converted image S1_1). The resolution-converted images S1_1 to S1_3 are respectively subjected to size reduction to ½, and images generated by the reduction are further reduced to ½. This procedure is repeated and the resolution-converted images are generated up to a predetermined quantity. In this manner, the images whose sizes have been reduced from the image S1_1 to every 2 to the power of $-\frac{1}{3}$ can be generated fast, mainly through the reduction to ½ that does not need interpolation of pixel values representing luminance. For example, in the case where the image S1_1 has the rectangular shape whose shorter sides respectively have 416 pixels, the resolution-converted images S1_2, S1_3 and so on have rectangular shapes whose shorter sides respectively have 330 pixels, 262 pixels, 208 pixels, 165 pixels, 131 pixels, 104 pixels, 82 pixels, 65 pixels, and so on. In this manner, the resolution-converted images reduced from the resolution-converted image S1_1 to every 2 to the power of $-\frac{1}{3}$ can be generated. The images generated without pixel value interpolation tend to keep characteristics of the original image. Therefore, accuracy improvement is expected in the face detection processing, which is preferable.

The normalization unit 20 carries out normalization processing on each of the images in the resolution-converted image group S1. More specifically, the normalization processing may be processing for converting the pixel values in the entire image according to a conversion curve (a look-up table) for causing the pixel values to be subjected to inverse Gamma transformation (that is, multiplication to the power of 2.2) in the sRGB color space followed by logarithmic conversion. This processing is carried out for the following reason.

An intensity I of light observed as an image is generally expressed as a product of a reflectance ratio R of a subject and an intensity L of a light source (that is, I=R×L). Therefore, the intensity I of the light changes with a change in the intensity L of the light source. However, the intensity I does not depend on the intensity L if the reflectance ratio R alone of the subject can be evaluated. In other words, face detection can be carried out with accuracy, without an effect of lightness of an image.

Let I1 and I2 denote intensities of light measured from parts of a subject whose reflectance ratios are R1 and R2, respectively. In log-log space, the following equation is derived:

$$\log(I_1) - \log(I_2) = \log(R_1 \cdot L) - \log(R_2 \cdot L) \quad (13)$$

$$= \log(R_1) + \log(L) - (\log(R_2) + \log(L))$$

$$= \log(R_1) - \log(R_2)$$

$$= \log(R_1 / R_2)$$

In other words, carrying out logarithmic conversion on pixel values in an image is equivalent to conversion into a space wherein a ratio between reflectance ratios is expressed as a difference. In such a space, only the reflectance ratios of the subject, which are not dependent on the intensity L of the light source, can be evaluated. More specifically, contrast (the difference itself of the pixel values) that varies according to lightness in an image can be adjusted.

Meanwhile, an image obtained by a device such as a general digital camera is in the sRGB color space. The sRGB color space is an internationally standardized color space wherein hue, saturation and the like are defined for consolidating differences in color reproduction among devices. In this color space, pixel values are obtained by multiplying an input luminance value to the power of 1/γout (=0.45) in order to enable color reproduction appropriate for an image output device whose Gamma value (γout) is 2.2.

Therefore, by evaluating the difference between the pixel values at predetermined points in the image converted according to the conversion curve that causes the pixel values in the entire image to be subjected to inverse Gamma transformation (that is, multiplication to the power of 2.2) followed by the logarithmic conversion, the reflectance ratios alone of the subject, which are not dependent on the intensity L of the light source, can be evaluated appropriately.

The face detection unit 30 carries out the face detection processing on each of the images in the resolution-converted image group S1' having been subjected to the normalization processing carried out by the normalization unit 20, and detects the face image S2 in each of the resolution-converted images. The face detection unit 30 comprises a detection control unit 31, a resolution-converted image selection unit 32, a sub-window setting unit 33, and a detector 34. The detection control unit 31 mainly carries out sequence control in the face detection processing by controlling each of the units. The resolution-converted image selection unit 32 sequentially selects from the resolution-converted image group S1' one of the resolution-converted images in order of smaller size to be subjected to the face detection processing. The sub-window setting unit 33 sets a sub-window for cutting each partial image W as a target of judgment of face or non-face image in the resolution-converted image selected by the resolution-converted image selection unit 32 while sequentially changing a position of the sub-window. The detector 34 judges whether the partial image W having been cut is a face image.

The detection control unit 31 controls the resolution-converted image selection unit 32 and the sub-window setting unit 33 for carrying out the face detection processing on each of the images in the resolution-converted image group S1'. For example, the detection control unit 31 appropriately instructs the resolution-converted image selection unit 32 to select the resolution-converted image to be subjected to the processing and notifies the sub-window setting unit 33 of a condition of sub-window setting. The detection control unit 31 also outputs a result of the detection to the redundant detection judgment unit 40.

The resolution-converted image selection unit 32 sequentially selects the resolution-converted image to be subjected to the face detection processing in order of smaller size (that is, in order of coarse resolution) from the resolution-converted image group S1', under control of the detection control unit 31. The method of face detection in this embodiment is a method of detecting a face in the input image S0 by judging whether each of the partial images W cut sequentially in the same size from each of the resolution-converted images is a face image. Therefore, the resolution-converted image selection unit 32 sets a size of face to be detected in the input image S0 at each time of detection, which is equivalent to changing the size of face to be detected from a larger size to a smaller size.

The sub-window setting unit 33 sequentially sets the sub-window according to the sub-window setting condition set by the detection control unit 31 in the resolution-converted image selected by the resolution-converted image selection unit 32 while sequentially moving the sub-window therein. For example, in the selected resolution-converted image, the sub-window setting unit 33 sequentially sets the sub-window for cutting the partial image W in the predetermined size (that is, 32×32 pixels) at a position on a line along which the resolution-converted image is scanned two-dimensionally, while rotating the resolution-converted image in 360 degrees in the plane of the image. The sub-window setting unit 33 outputs the partial images W to the detector 34.

The detector 34 calculates characteristic quantities related to difference in the pixel values (luminance) between predetermined positions, as at least one of characteristic quantities related to distribution of the pixel values in the partial image W. By using the characteristic quantities, the detector 34 judges whether the partial image W represents a face in any one of predetermined directions or a non-face object. For example, the detector 34 can make judgment on 5 types of faces, namely a front-view face, a left profile, a right profile, a half-left profile, and a half-right profile. The face directions may be categorized further. Since the detector 34 is to judge an image representing a face in an arbitrary face direction, an image of face in any direction and orientation can be judged.

The configuration of the detector 34, a training (generation) method therefore, and a procedure carried out therein are described next. For the sake of simpler description, a case of 3-class problem is described. More specifically, the case is described where the detector 34 judges the partial image W as any one of 3 objects comprising a "front-view face", a "profile", and a "non-face" object.

Figure 3:
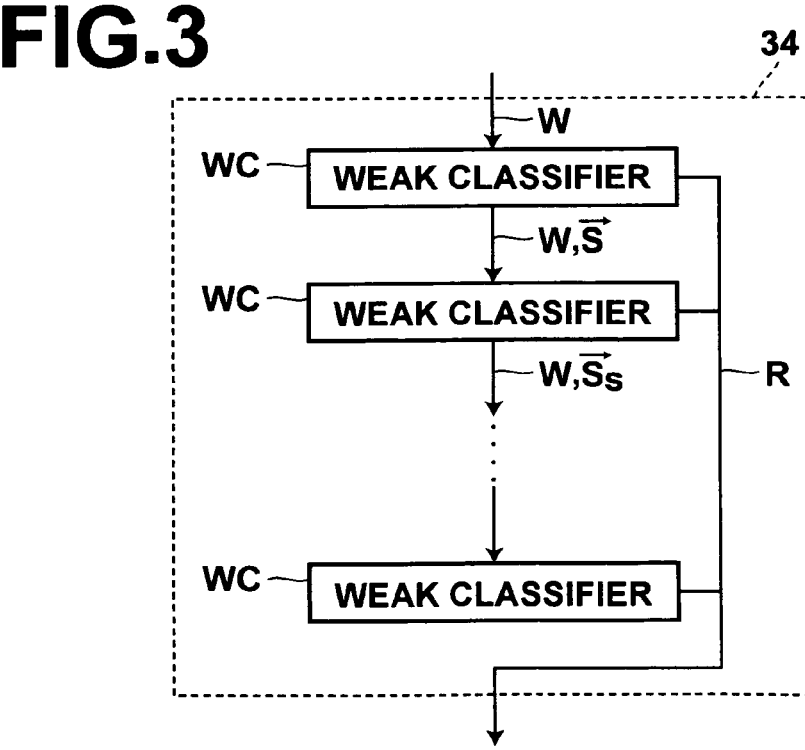
FIG. 3 is a block diagram showing the configuration of a detector.

FIG. 3 shows the configuration of the detector 34. As shown in FIG. 3, the detector 34 comprises weak classifiers WC connected in order of effectiveness for judgment selected from more weak classifiers through training that will be described later.

Each of the weak classifiers WC calculates the characteristic quantities from the partial image W according to a predetermined algorithm specific thereto, and finds a score vector <s> representing a probability that the partial image W represents a "front-view face", a probability that the partial image W represents a "profile", and a probability that the partial image W represents a "non-face" object, based on the characteristic quantities and a 2-dimensional histogram that will be described later. The detector 34 judges which one of the objects the partial image W represents, by evaluating the score vector <s> obtained from all or a part of the weak classifiers WC.

Training of the detector 34 is described next.

Figure 8:
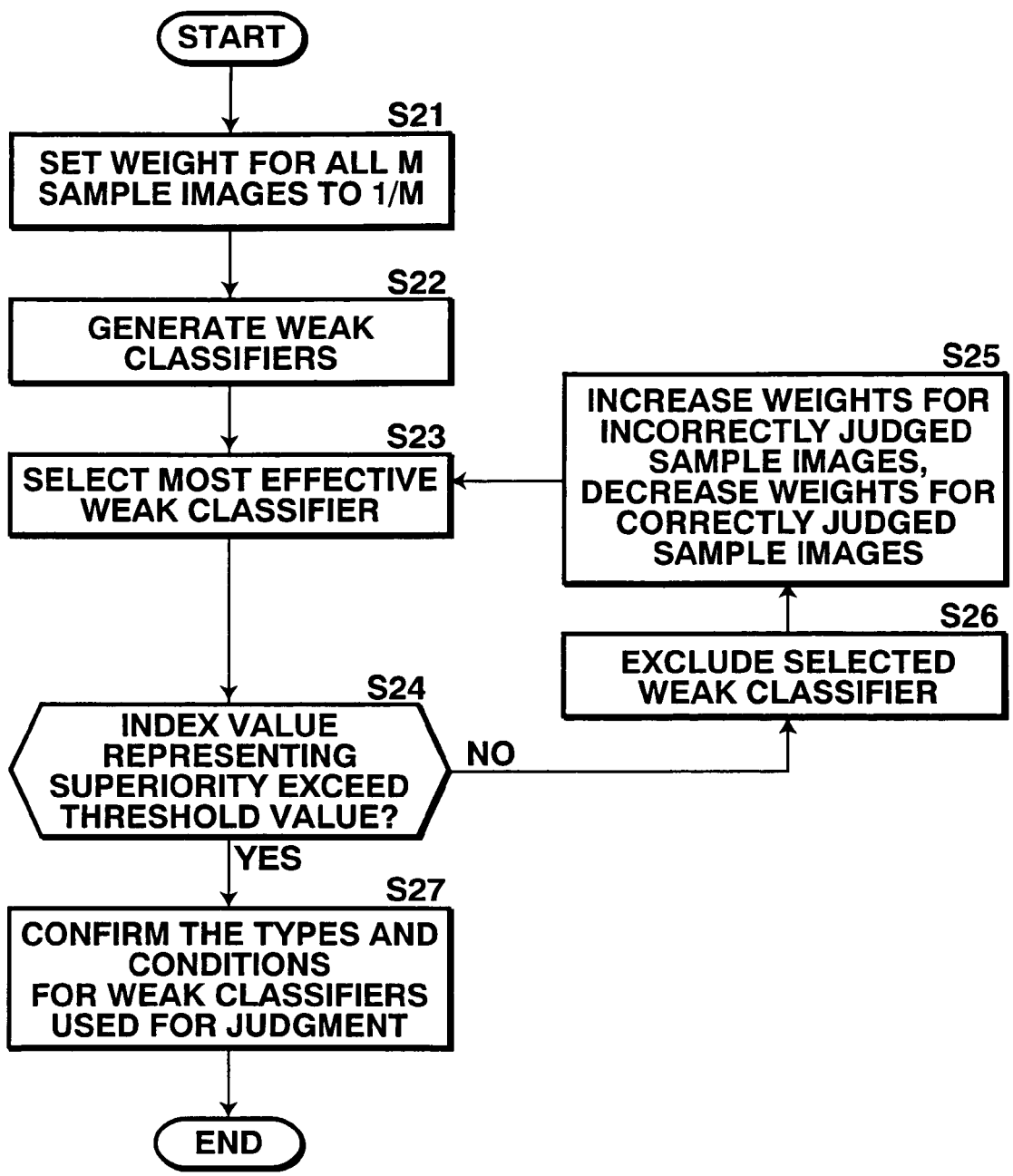
FIG. 8 is a flow chart showing a learning method for the detector.
Figure 9:
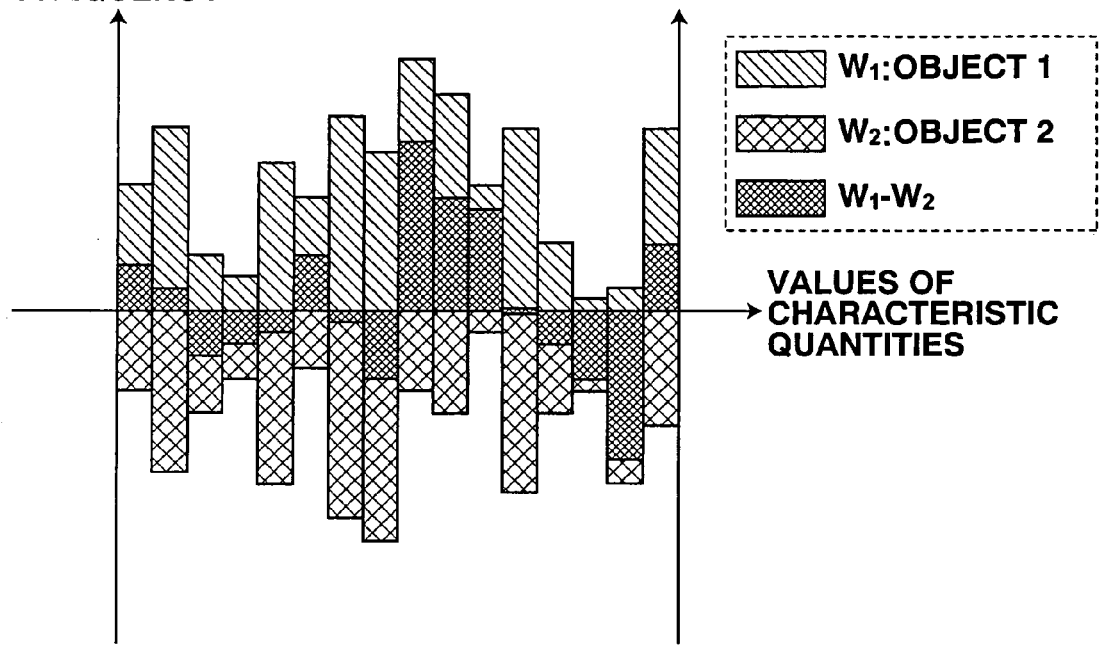
FIG. 9 shows a histogram of a weak classifier for a conventional 2-class problem.
Figure 10:
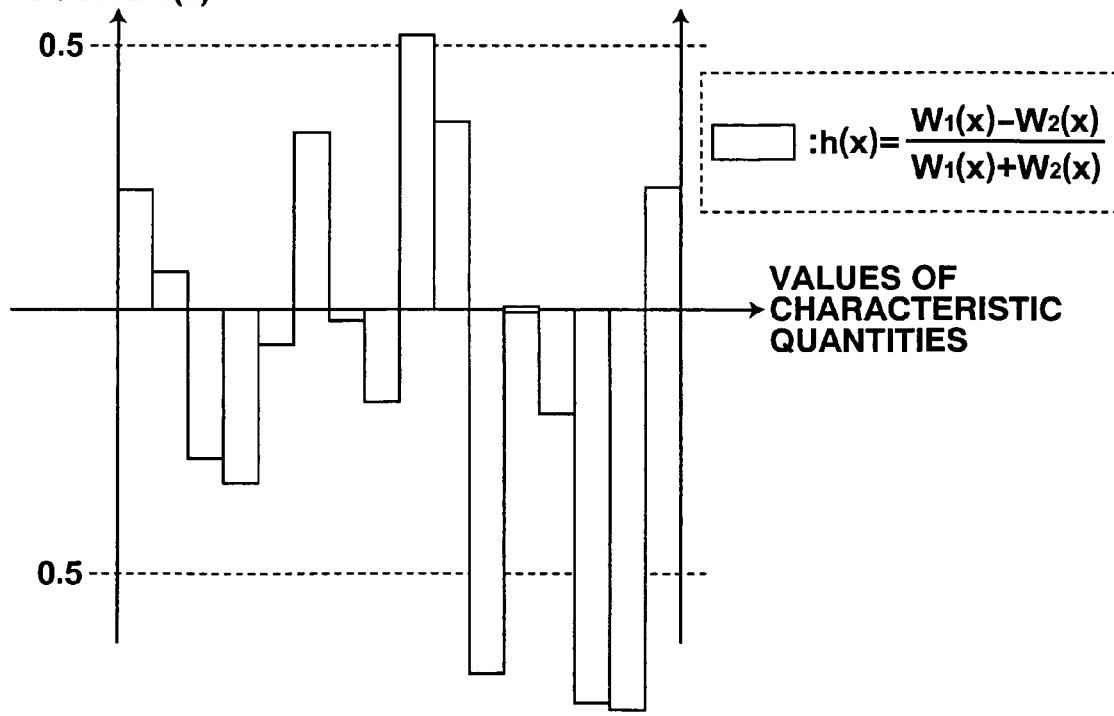
FIG. 10 shows a histogram which is employed as a criterion for judging whether an image represents a predetermined object.

FIG. 8 is a flow chart showing the method of training for the detector 34. For the training, sample images normalized to have the predetermined size such as 32×32 pixels are used. The sample images needs to be prepared for the types corresponding to the number of classes to be judged. In this embodiment, front face sample images representing front-view faces, profile sample images representing profiles, and non-face sample images representing non-face objects are prepared. The orientations of the faces are substantially the same in the front face sample images and the profile sample images. Each of the sample images has been subjected to the same processing as the normalization processing carried out by the normalization unit 20, and a weight (a degree of importance) has been assigned thereto.

Let M be the number of the sample images. The weight (hereinafter represented by w1($i$) where i=1, . . . M) for each of the sample images is initially set to 1/M (Step S21):

$$w1(i)=1/M \tag{9}$$

The weak classifiers are generated for respective pair groups of a plurality of types, each of which uses 2 predetermined points as one pair set in the plane of each of the sample images and in the planes of reduced images thereof (Step S22). Each of the weak classifiers provides a criterion for judging whether the partial image W is a front-view face, or a profile, or a non-face object by using a combination of the pixel value (luminance) differences each of which is calculated between the 2 points comprising one of the pairs in one of the pair groups set in the planes of the partial image W cut by the sub-window and the reduced images thereof. In this embodiment, a multi-dimensional histogram regarding the combination of the pixel value differences is used as a basis for a score table for the corresponding weak classifier.

Generation of the histogram from the sample images is described below with reference to FIGS. 11 and 12. As shown on the left side of FIG. 11, the 2 points comprising each of the pairs in one of the pair groups used for generation of the classifier are P1 and P2, P1 and P3, P4 and P5, P4 and P6, and P6 and P7 in the front-face sample images. The point P1 is located at the center of the right eye in each of the face sample images while the point P2 is located in the right cheek therein. The point P3 is located between the eyebrows. The point P4 is located at the center of the right eye in the reduced image of 16×16 pixels generated through 4-neighbor averaging (which will be described later) of the corresponding sample image while the point P5 is located in the right cheek therein. The point P6 is located in the forehead in the reduced image of 8×8 pixels generated through further 4-neighbor averaging while the point P7 is located on the mouth therein. Coordinate positions of the 2 points comprising each of the pairs in one of the pair groups used for generation of the corresponding classifier are the same for all the sample images. For each of the face sample images, the combination of the pixel value differences is found for the 5 pairs, and a histogram W1($x$) thereof is generated where x refers to a value corresponding to the combination of the pixel value differences each of which is calculated between the 2 points in each of the pairs. The difference can take values of 65536 patterns in the case where the luminance is represented by 16-bit gradation. Therefore, although the combination of the differences depends on the number of luminance gradations, the whole combination of the differences can take patterns of 65536 to the power of 5, that is, the number of gradations to the power of the number of the pairs. Consequently, the training and the detection require a large amount of samples, time, and memory. For this reason, in this embodiment, the differences are divided into ranges of appropriate width and quantized into n-values (such as n=100). In this manner, the combination of the differences can take patterns of n to the power of 5, which can reduce data representing the combination.

Likewise, for the profile sample images and non-face sample images, histograms W2($x$) and W3($x$) are generated. For the profile sample images and the non-face sample images are used the same positions as the positions of the predetermined 2 points (represented by the same reference codes P1 to P7) in each of the pairs in each of the face sample images.

Figure 12:
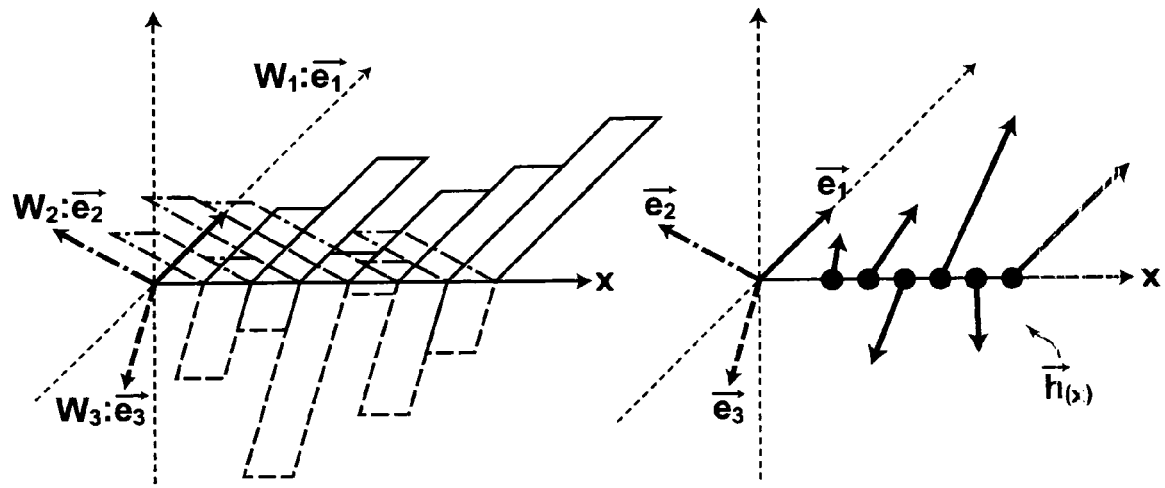
FIG. 12 shows a multi-dimensional histogram.

A two-dimensional histogram shown in FIG. 12 is then generated by combining the 3 histograms W1($x$) to W3($x$) according to the following equation.

(General Equation)

$$\vec{h}(x) = \frac{\sum_{i=1}^{N} W_i(x)\vec{e_i}}{\sum_{i=1}^{N} W_i(x)}$$

$\|\vec{e_i}\| = 1,$
$i = 1, \ldots, N$ $$\vec{e_i} \cdot \vec{e_j} = \begin{cases} 1, & i = j \\ -\frac{1}{N-1}, & i \neq j \end{cases}$$

-continued $$\sum_{i=1}^{N} \vec{e_i} = \vec{0} \quad \vec{e_i} \cdot (\vec{e_j} - \vec{e_k}) = 0 \tag{8}$$

(for a 3-class problem corresponding to N=3)

$$\vec{h}(x) = \frac{W_1(x)\vec{e_1} + W_2(x)\vec{e_2} + W_3(x)\vec{e_3}}{W_1(x) + W_2(x) + W_3(x)}$$

$$\vec{e_1} = (1, 0), \quad \vec{e_2} = \left(-\frac{1}{2}, \frac{\sqrt{3}}{2}\right), \quad \vec{e_3} = \left(-\frac{1}{2}, \frac{\sqrt{3}}{2}\right) \tag{14}$$

where a vector <h(x)> is a two-dimensional histogram and vectors <e1>, <e2>, and <e3> are basis vectors.

The two-dimensional histogram h(x) is the score vector <s> itself in the case where the value corresponding to the combination of the characteristic quantities is x. The inner product of the score vector <s> and the basis vector <e1> is a score SC1 representing the probability of front-view face while the inner product of the score vector <s> and the basis vector <e2> is a score SC2 representing the probability of profile. Likewise, the inner product of the score vector <s> and the basis vector <e3> is a score SC3 representing the probability of non-face object. At Step S22, each of the weak classifiers WC in the form of the histogram is generated for the combination of the pixel-value differences each of which is calculated between the 2 predetermined points in each of the pairs comprising each of the pair groups of the different types.

Among the weak classifiers generated at Step S22, the weak classifier WC that is most effective for the judgment is selected. This selection is carried out in consideration of the weight for each of the sample images. In this example, a weighted superiority is examined for each of the weak classifiers, and the weak classifier achieving the highest superiority is selected (Step S23). More specifically, the weight for each of the sample images is 1/M at Step S23 carried out for the first time. Therefore, superiority becomes higher as the score for the object as the correct answer among a front-view face, a profile, and a non-face object becomes larger than the scores for the incorrect answers. Consequently, the most effective classifier WC is selected as the classifier having the highest superiority regarding all the sample images. At Step S23 carried out for the second time after Step S25 whereat the weight is updated for each of the sample images as will be described later, the sample images have the weights that are 1/M, larger than 1/M, and smaller than 1/M. The sample images whose weights are larger than 1/M contribute more to evaluation of the superiority than the sample images whose weights are 1/M. Therefore, at Step S23 carried out for the second time or later, correct judgment of the sample images of the larger weights is more important than correct judgment of the sample images of the smaller weights. More specifically, the two-dimensional histogram <hk (x)> representing the weak classifier WC of the highest superiority is extracted according to the following equation where k refers to the number of repetition of execution of Step S23.

$$\vec{h}_k(x) = \underset{h_k(x) \in H}{\operatorname{argmin}} \left( \sum_{i=1}^{M} w_k(i) \exp\left( \max_{j \neq i} \left( \vec{h}_k(x_i) \cdot \vec{e_j} \right) - \vec{h}_k(x_i) \cdot \vec{e_i} \right) \right) \quad (10)$$

In the above equation, Xi refers to a value corresponding to the combination of the characteristic quantities found from each of the sample images, <ei> is the basis vector corresponding to the object as the correct answer among a front-view face, a profile, or a non-face object in the corresponding sample image (hereinafter referred to as the correct object) while <ej> is the basis vector corresponding to each of the objects as the incorrect answers (hereinafter referred to as the incorrect objects).

Judgment is then made as to whether the sum of the score calculated by the selected weak classifiers WC for the correct object among a front-view face, a profile, or a non-face object in the sample images exceeds the sum of the scores for the incorrect objects or as to whether the number of repetition of Step S23 reaches a predetermined number (Step S24). More specifically, whether either one of the following conditions is satisfied is judged:

$$\max_{j \neq i} \left( \left( \sum_{i=1}^{K} \vec{h}_k(x_i) \right) \cdot \vec{e_j} \right) < \left( \sum_{k=1}^{K} \vec{h}_k(x_i) \right) \cdot \vec{e_i} \text{ or } k = k_{\max} \quad (12)$$

where K refers to the number of repetition of Step S23 at the current stage. In the case where either one of the above-described conditions is satisfied, the image can be judged with a sufficiently high probability as a front-view face, a profile, or a non-face object by the weak classifiers having been selected. Therefore, the training ends. In the case where the conditions are not satisfied, the procedure goes to Step S26 for selecting an additional one of the classifiers WC to be used in combination with the classifiers having been selected.

At Step S26, the weak classifier WC selected at the immediately preceding Step S23 is excluded so that the same classifier is not selected again.

The weights are then increased for the sample images for which the score has not been calculated with superiority by the weak classifier selected at the immediately preceding Step S23 while the weights for the sample images for which the score has been calculated with sufficient superiority are decreased (Step S25). More specifically, the weights are updated according to the following equation:

$$w_{k+1} = \frac{w_k(i) \exp\left( \max_{j \neq i} \left( \vec{h}_k(x_i) \cdot \vec{e_j} \right) - \vec{h}_k(x_i) \cdot \vec{e_i} \right)}{\sum_{i=1}^{M} \left( w_k(i) \exp\left( \max_{j \neq i} \left( \vec{h}_k(x_i) \cdot \vec{e_j} \right) - \vec{h}_k(x_i) \cdot \vec{e_i} \right) \right)} \quad (11)$$

Figure 13:
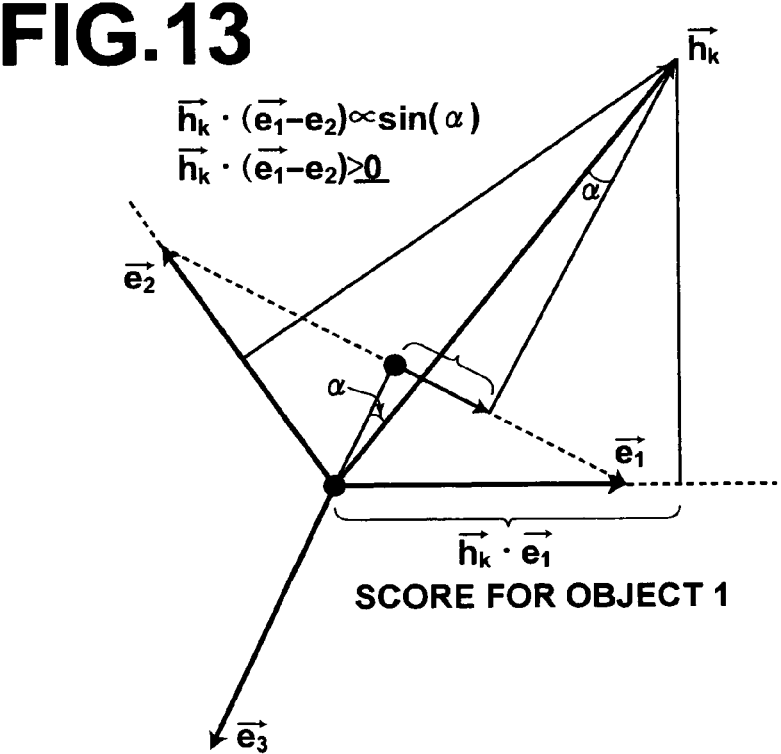
FIG. 13 shows the case where a score for an object as a correct answer and a score for an object as an incorrect answer are both positive.
Figure 14:
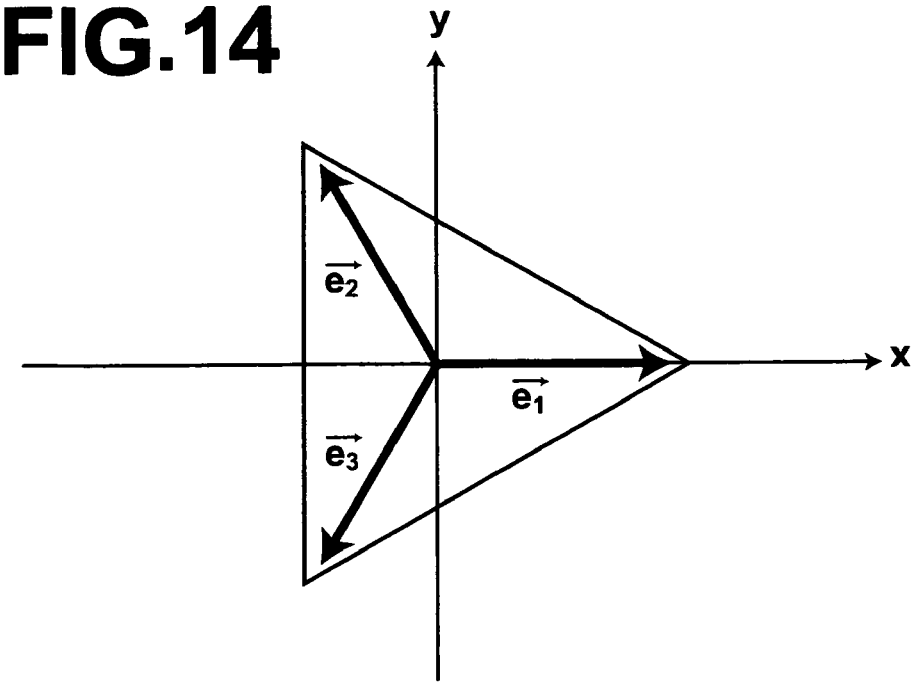
FIG. 14 shows basis vectors.
Figure 15:
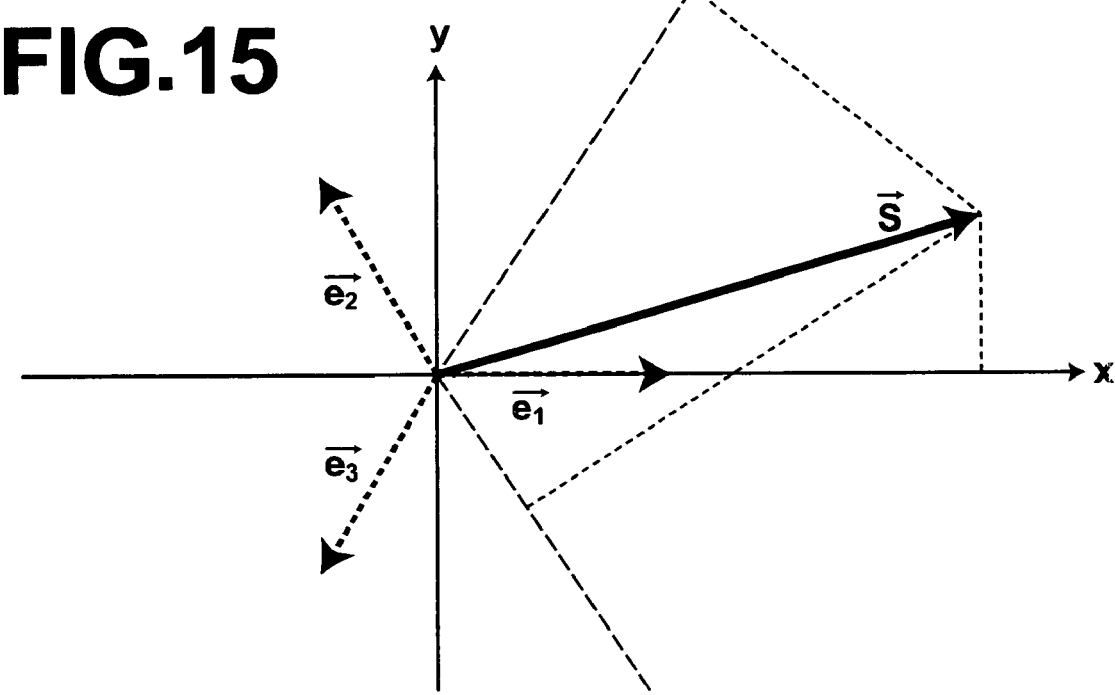
FIG. 15 shows a score vector.

As shown by the second term of the numerator in the above equation, the weights are decreased for the sample images if the score for the correct object (for example, the inner product represented by <hk>·<e2> in the case where Object 2 is the correct object) is large. In the case where the score is a negative value, the weights are increased. However, as shown in FIG. 13, the case may happen where the score for the correct object (Object 2 in FIG. 13) and the score for either one of the remaining objects (Object 1 in FIG. 13) are both positive. Therefore, an amount obtained by projection onto a direction appropriate for judgment of the objects (that is, <e1>-<e2> representing a side) is used for updating the corresponding weight. The weights are increased or decreased for enhancing an effect of the combination of the weak classifiers WC by putting emphasis on selecting the weak classifier WC enabling calculation of the score with superiority on the images that have not been calculated with superiority by the weak classifiers WC having been selected.

The procedure then returns to Step S23 whereat the weak classifier WC that is the most effective among the remaining classifiers is selected with reference to the weighted superiority.

If either one of the predetermined conditions is satisfied at Step S24 after selection of the weak classifier WC appropriate for judgment of the correct object (that is, a front-view face, or a profile, or a non-face object) corresponding to the combination of the pixel-value differences each of which is calculated between the 2 predetermined points comprising each of the pairs in a specific one of the pair groups through repetition of the procedure from Step S23 to Step S26, the types of the weak classifiers WC used for the face detection and conditions therefore are confirmed (Step S27), and the training is completed. The selected weak classifiers WC are linearly connected in order of higher weighted superiority, and the weak classifiers WC comprise the detector 34. The two-dimensional histogram obtained for each of the weak classifiers WC is used as the score vector for calculating the scores for a front-view face, a profile, and a non-face object according to the combination of the pixel-value differences.

The procedure carried out in the detector 34 is described next.

Figure 4:
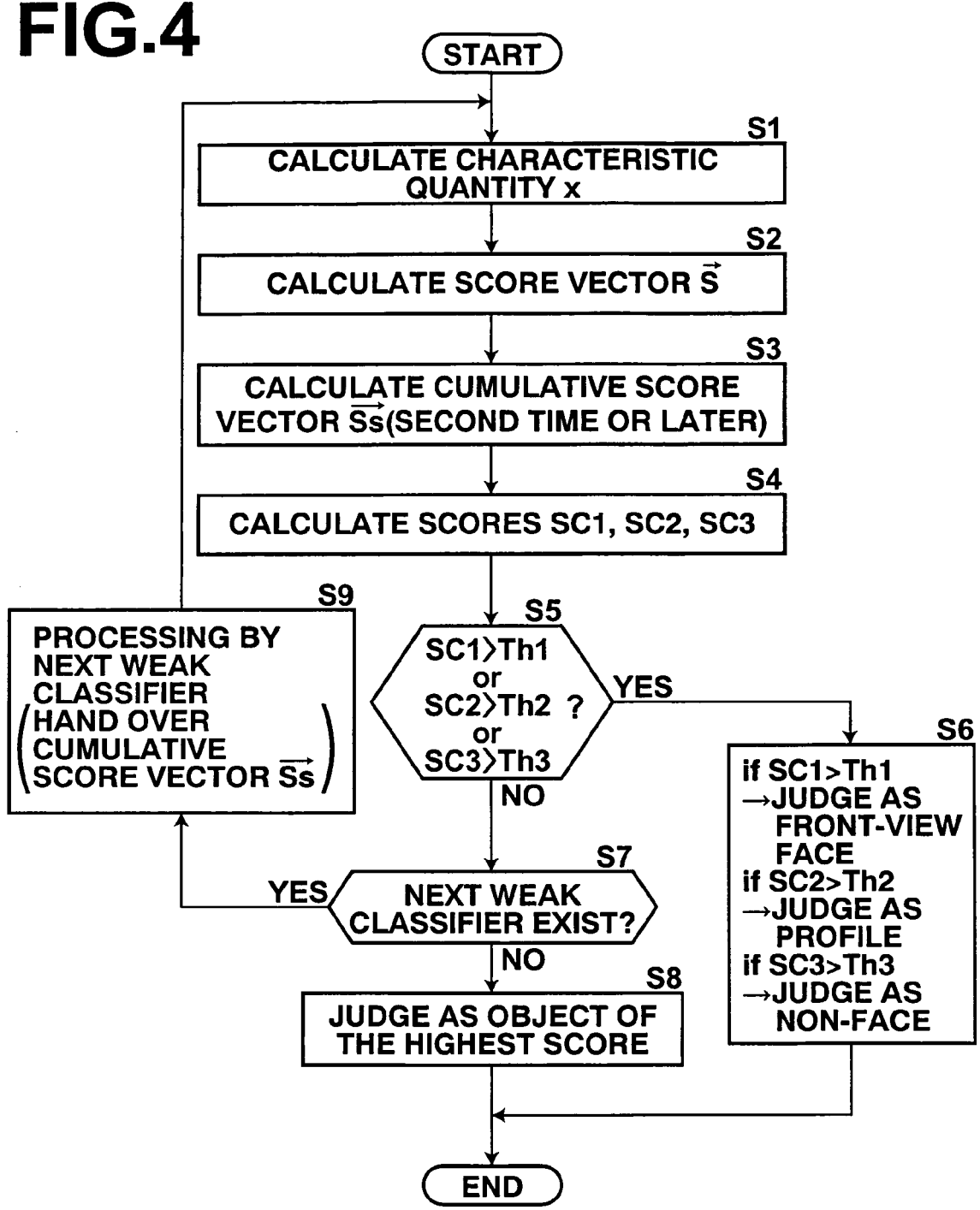
FIG. 4 shows a processing flow in the detector.

FIG. 4 is a flow chart showing the procedure carried out in the detector 34. When the partial image W is input thereto, the first weak classifier WC calculates the value x as a characteristic quantity (Step S1). For example, as shown in FIG. 5, the first weak classifier WC carries out the 4-neighbor averaging on the partial image W of the predetermined size such as 32×32 pixels. The 4-neighbor averaging refers to processing wherein the image is divided into blocks of 2×2 pixels and a mean value of the values of the 4 pixels in each of the blocks is used as a pixel value corresponding to the block. In this manner, the reduced images of 16×16 pixels and 8×8 pixels are obtained. Using the two predetermined points set in the plane of each of the 3 images as one pair, the difference value in the pixel values (luminance) is calculated between the two points in each pair comprising one of the pair groups, and the combination of the difference values is used as the characteristic quantities. The two predetermined points in each of the pairs are predetermined two points aligned vertically or horizontally in each of the images so as to reflect a characteristic of density of a face therein, for example. The value corresponding to the combination of the difference values (the characteristic quantities) is found as the characteristic quantity x. Based on the value x, the score vector <s> is calculated based on the two-dimensional histogram thereof (Step S2). A cumulative score vector <ss> is then calculated by adding the score vector to the score vector handed over from the preceding weak classifier (Step S3). Since the first weak classifier WC does not have the score vector handed over thereto, the score vector calculated by the first weak classifier is used as the cumulative score vector <ss> as it is. The scores SC1, SC2, and SC3 respectively representing the probabilities of the partial image W being an image of front-view face, profile, and non-face object are calculated as the inner products between the score vector <ss> and each of the basis vectors <e1>, <e2>, and <e3>. (Step S4) Whether any one of the scores SC1, SC2, or SC3 exceeds a predetermined threshold value is judged (Step S5). In other words, whether the condition SC1>Th1 or whether the condition SC2>Th2 or whether the condition SC3>Th3 is satisfied is judged. In the case where the condition SC>Th1 is satisfied, the partial image W is judged to be an image representing a front-view face. In the case where the condition SC2>Th2 is satisfied, the partial image W is judged to be an image representing a profile. The partial image W is judged to be a non-face image in the case where the condition SC3>Th3 is satisfied (Step S6). The procedure ends in these cases. In the case where all the conditions are not satisfied at Step S5, whether the next weak classifier WC exists is judged (Step S7). If a result of judgment at Step S6 is affirmative, the cumulative score vector <ss> is handed over to the next weak classifier WC for causing the next weak classifier to carry out the judgment (Step S9). If the result of the judgment at Step S7 is negative, the partial image W is judged to be an image representing the object corresponding to the highest score (Step S8) to end the procedure.

The redundant detection judgment unit 40 carries out processing for classifying the face images representing the same face in the images in the resolution-converted image group S1' (that is, the face images detected more than once) into one face image according to position information on the true face images S2 detected by the face detection unit 30, and outputs the true face image S3 detected in the input image S0. The size of face detected by the detector compared to the size of the partial image W has some margin although the margin depends on the training method. Therefore, this processing is carried out because the images representing the same face are sometimes detected more than once in the resolution-converted images whose resolutions are close to each other.

In this embodiment, the sub-window setting unit 33 serves as the partial image cutting means and the detector 34 serves as the judgment means of the present invention.

A procedure carried out in the face detection system 1 is described next.

Figure 7:
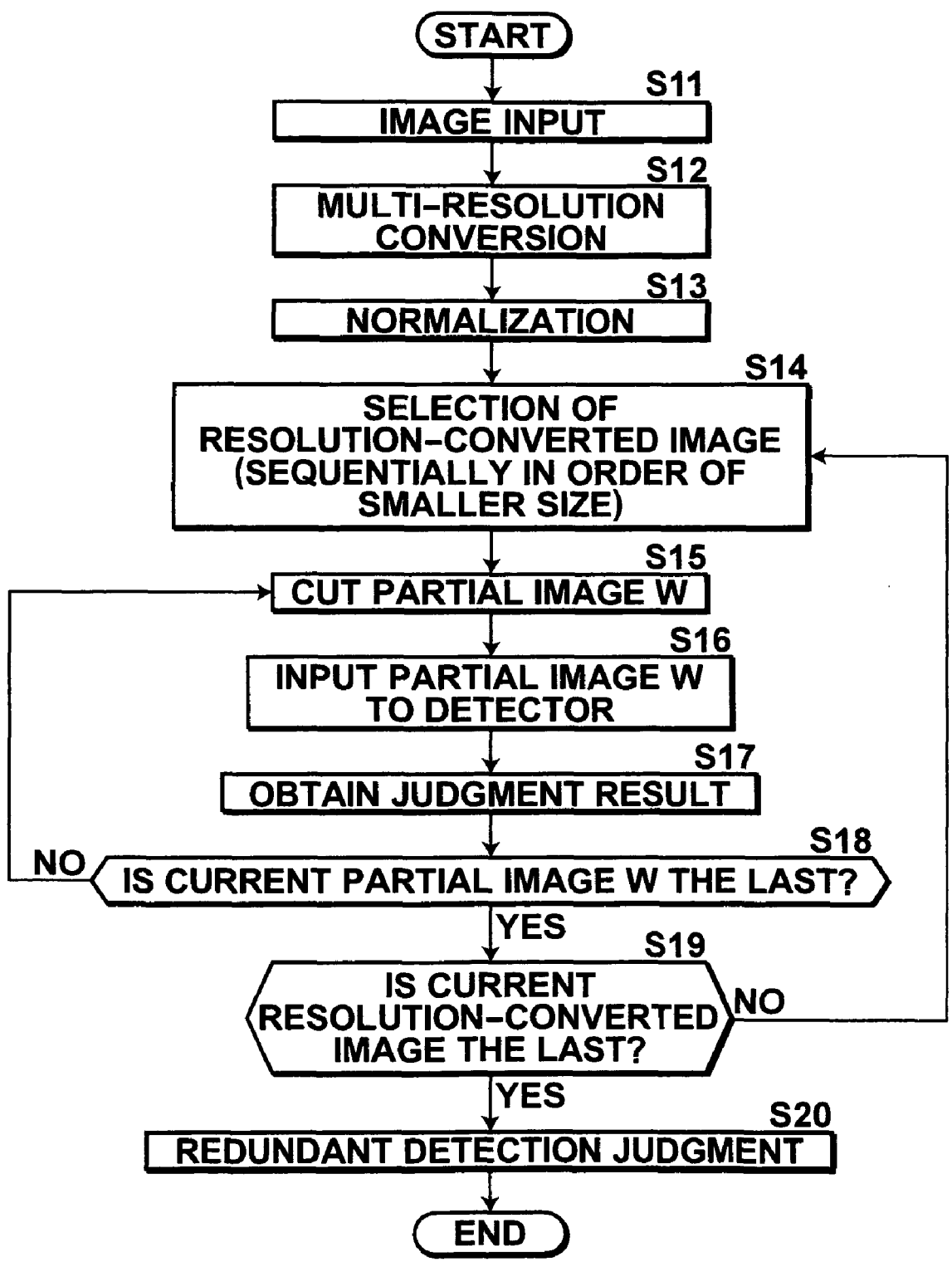
FIG. 7 is a flow chart showing processing in the face detection system.

FIG. 7 is a flow chart showing the procedure. As shown in FIG. 7, the input image S0 is fed to the multi-resolution conversion unit 10 (Step S11), and the image S0' is generated in the predetermined size converted from the size of the input image S0. The resolution-converted image group S1 is generated comprising the resolution-converted images having the sizes (resolutions) reduced to every 2 to the power of −⅓ from the image S0' (Step S12). The normalization unit 20 carries out the normalization processing for reducing the variance of contrast in each of the resolution-converted images to obtain the normalized resolution-converted image group S1' (Step S13). In the face detection unit 30, the resolution-converted image selection unit 32 instructed by the detection control unit 31 sequentially selects the resolution-converted image to be subjected to the face detection processing in order of smaller image size from the resolution-converted image group S1'. In other words, the resolution-converted image is selected in order of S1'_n, S1'_n−1, . . . , and S1'_1 (hereinafter referred to as S1' _i) from the resolution-converted image group S1' (Step S14). The detection control unit 31 sets the sub-window setting condition for the sub-window setting unit 33. In response, the sub-window setting unit 33 sets the sub-window in the resolution-converted image S1'_i while sequentially moving the sub-window for cutting the partial image W of the predetermined size (Step S15), and inputs the partial image W to the detector 34 (Step S16). The detector 34 judges whether the partial image W input thereto is an image of any one of the 3 objects, and the detection control unit 31 obtains the result R of the judgment (Step S17). The detection control unit 31 judges whether the partial image W currently cut is the partial image to be subjected last to the detection (Step S18). In the case where a result of the judgment is affirmative, the procedure goes to Step S19. Otherwise, the procedure returns to Step S15 for newly cutting the partial image W. In this manner, the face image in the resolution-converted image S1'_i is extracted.

After the detection is completed for the resolution-converted image S1'_i, the detection control unit 31 judges whether the resolution-converted image S1'_i currently selected is the image to be subjected last to the detection (Step S18). In the case where a result of the judgment is affirmative, the detection processing ends, and the redundant detection judgment is carried out (Step S19). Otherwise, the procedure returns to Step S14 whereat the resolution-converted image selection unit 32 selects the resolution-converted image S1'_i−1 whose size is larger than the currently selected resolution-converted image S1'_i by one step, for further carrying out the face detection.

Figure 6:
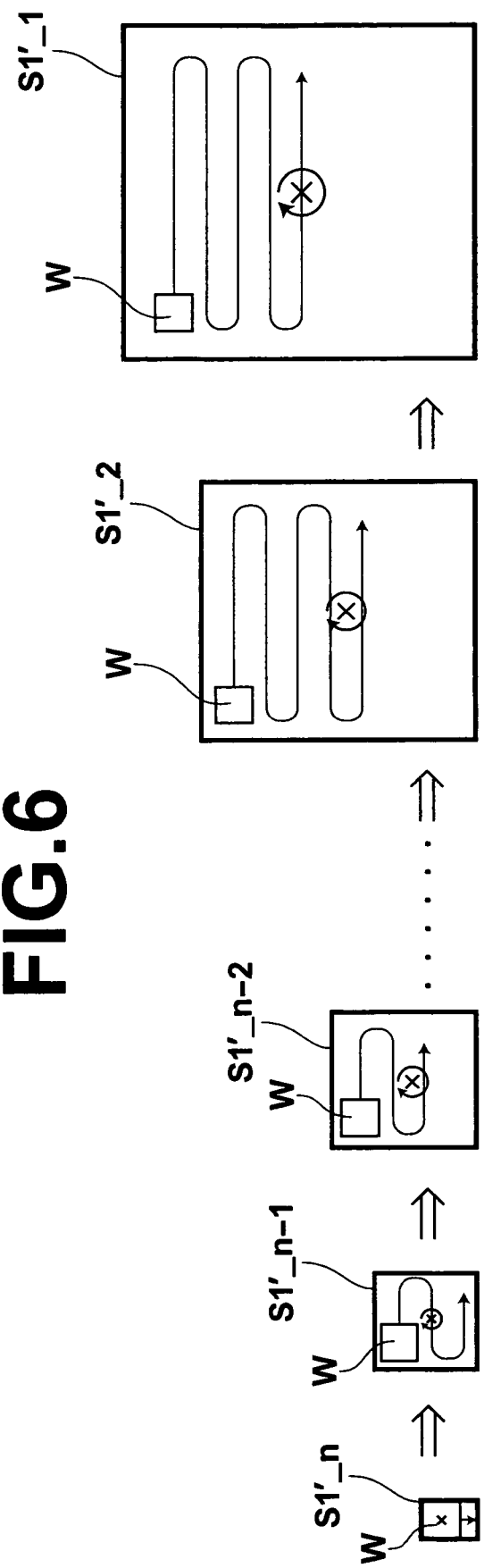
FIG. 6 shows switching of resolution-converted images as targets of face detection and movement of a sub-window therein.

By repeating the procedure from Step S14 to Step S19 described above, the face image S2 can be detected in each of the resolution-converted images. FIG. 6 shows selection of the resolution-converted images in order of smaller size, and face detection is carried out therein.

At Step S20, the redundant detection judgment unit 40 classifies the face images S2 detected more than once into one face image, and the true face image S3 detected in the input image S0 is output.

As has been described above, according to the face detection system related to the embodiment of the present invention, in the method of detecting a face as a detection target in an input image by judging whether each of the partial images cut at a different position in the input image represents a predetermined face by use of the weak classifiers that evaluate whether a target image is the predetermined face based on the histogram of the values of the characteristic quantities calculated from the sample images representing the predetermined face as a predetermined object, the histogram is extended to multi-dimensions and the criterion for the evaluation is the multi-dimensional histogram representing the histograms for the different types of faces in the form of the vector. Therefore, by evaluating the direction and magnitude of the vector in the multi-dimensional histogram corresponding to the values of the characteristic quantities calculated from each of the partial images, which one of the objects the partial image represents can be judged at once. In this manner, the faces of different types can be judged by carrying out the cutting of the partial images from the input image and the judgment while scanning the input image only once. Consequently, face detection can be carried out efficiently for the plurality of types.

Furthermore, the faces of the different types can be learned by the detector through the training carried out only once. Therefore, the training can be carried out efficiently.

More specifically, in order to perfectly judge 3 objects A, B, and C, three detectors for 2-body problem, that is, a detector for judgment between A and B, a detector for judgment between B and C, and a detector for judgment between A and C are necessary. Each of the detectors is a one-dimensional histogram, and histograms for 3 dimensions are necessary. Meanwhile, in the method of the present invention, the histograms for only 2 dimensions are sufficient. In general, in order to completely solve an N-body problem by detectors for a 2-body problem, the histograms for dimensions of all combinations (NC2) are necessary. However, in the method of the present invention, only the histograms for the dimensions of N−1 are sufficient.

It also needs to be considered that the total amount of the histograms depends not only on the number of dimensions but also the number of the weak classifiers. However, the number of combinations (NC2) increases as the power of N while the number of (N−1) shows a linear increase of N. Therefore, if N is large, the increase in the total amount of the histograms of the weak classifiers can be compensated.

Although the face detection system related to the embodiment of the present invention has been described above, a program for causing a computer to execute the procedure carried out by the objects detection apparatus of the present invention in the face detection system is also an embodiment of the present invention. Furthermore, a computer-readable recording medium storing the program is also an embodiment of the present invention.

What is claimed is:

1. A method of objects detection for detecting different objects in an input image, the method comprising the steps of:
    preparing a plurality of weak classifiers each of which selects a vector in an N−1 (N≧3) dimensional histogram, the vector corresponding to values of characteristic quantities related to distribution of luminance calculated from each of partial images of a predetermined size cut from the input image, the N−1 dimensional histogram generated by:
    obtaining N histograms of values of the characteristic quantities for predetermined objects of N types through calculation of the characteristic quantities for each of the N types from different sample images representing the predetermined objects;
    converting values of frequency in the respective N histograms into vectors by linearly combining the values of frequency with predetermined N basis vectors corresponding to the N histograms one to one, the basis vectors having the same magnitude and isotropy in an N−1 dimensional space; and
    obtaining the N−1 dimensional histogram by combining the vectors of frequency for the values of the characteristic quantities corresponding to each other between the N histograms;
    cutting the partial images of the predetermined size at different positions in the input image; and
    carrying out judgment as to which one of the N types of the predetermined objects each of the partial images represents by:
    combining the vector or vectors selected by at least one of the weak classifiers by applying the classifier or classifiers on each of the partial images;
    extracting components of the basis vectors of the combined vector as scores respectively representing probabilities of the corresponding partial image being the predetermined objects of the N types corresponding to the basis vectors; and
    carrying out the judgment based on magnitude of the scores.

2. The method of objects detection according to claim 1, wherein the weak classifiers are connected serially, and the step of carrying out the judgment is the step of judging that each of the partial images represents one of the predetermined objects by:
    adding the vectors selected by the weak classifiers by sequentially applying the weak classifiers from the first classifier to each of the partial images; and
    judging each of the partial images being an image of the predetermined object corresponding to one of the scores extracted according to the combined vector in the case where the score exceeds a predetermined threshold value.

3. The method of objects detection according to claim 2, wherein the weak classifiers have been selected from a plurality of weak classifiers according to a method of learning by boosting.

4. The method of objects detection according to claim 3, wherein the weak classifiers are connected in order determined according to the method of learning by boosting.

5. An apparatus of objects detection for detecting different objects in an input image, and the apparatus comprising:
    a plurality of weak classifiers each of which selects a vector in an N−1 (N≧3) dimensional histogram, the vector corresponding to values of characteristic quantities related to distribution of luminance calculated from each of partial images of a predetermined size cut from the input image, the N−1 dimensional histogram generated by:
    obtaining N histograms of values of the characteristic quantities for predetermined objects of N types through calculation of the characteristic quantities for each of the N types from different sample images representing the predetermined objects;
    converting values of frequency in the respective N histograms into vectors by linearly combining the values of frequency with predetermined N basis vectors corresponding to the N histograms one to one, the basis vectors having the same magnitude and isotropy in an N−1 dimensional space; and
    obtaining the (N−1) dimensional histogram by combining the vectors of frequency for the values of the characteristic quantities corresponding to each other between the N histograms;
    partial image cutting means for cutting the partial images of the predetermined size at different positions in the input image; and
    judgment means for carrying out judgment as to which one of the N types of the predetermined objects each of the partial images represents by:
    combining the vector or vectors selected by at least one of the weak classifiers by applying the classifier or classifiers on each of the partial images;
    extracting components of the basis vectors of the combined vector as scores respectively representing probabilities of the corresponding partial image being the predetermined objects of the N types corresponding to the basis vectors; and
    carrying out the judgment based on magnitude of the scores.

6. The apparatus of objects detection according to claim 5, wherein the weak classifiers are connected serially, and the judgment means judges that each of the partial images represents one of the predetermined objects by:
    adding the vectors selected by the weak classifiers by sequentially applying the weak classifiers from the first classifier to each of the partial images; and
    judging each of the partial images being an image of the predetermined object corresponding to one of the scores extracted according to the combined vector in the case where the score exceeds a predetermined threshold value.

7. The apparatus of objects detection according to claim 6, wherein the weak classifiers have been selected from a plurality of weak classifiers according to a method of learning by boosting.

8. The apparatus of objects detection according to claim 7, wherein the weak classifiers are connected in order determined according to the method of learning by boosting.

9. A computer-readable medium embodying a program for causing a computer to function as means of objects detection for detecting different objects in an input image, the program causing the computer to function as:

a plurality of weak classifiers each of which selects a vector in an N−1 (N≧3) dimensional histogram, the vector corresponding to values of characteristic quantities related to distribution of luminance calculated from each of partial images of a predetermined size cut from the input image, the N−1 dimensional histogram generated by:

obtaining N histograms of values of the characteristic quantities for predetermined objects of N types through calculation of the characteristic quantities for each of the N types from different sample images representing the predetermined objects;

converting values of frequency in the respective N histograms into vectors by linearly combining the values of frequency with predetermined N basis vectors corresponding to the N histograms one to one, the basis vectors having the same magnitude and isotropy in an N−1 dimensional space; and obtaining the (N−1) dimensional histogram by combining the vectors of frequency for the values of the characteristic quantities corresponding to each other between the N histograms;

partial image cutting means for cutting the partial images of the predetermined size at different positions in the input image; and judgment means for carrying out judgment as to which one of the N types of the predetermined objects each of the partial images represents by:

combining the vector or vectors selected by at least one of the weak classifiers by applying the classifier or classifiers on each of the partial images;

extracting components of the basis vectors of the combined vector as scores respectively representing probabilities of the corresponding partial image being the predetermined objects of the N types corresponding to the basis vectors; and carrying out the judgment based on magnitude of the scores.

10. The computer-readable medium according to claim 9, wherein the weak classifiers are connected serially and the judgment means judges that each of the partial images represents one of the predetermined objects by:

adding the vectors selected by the weak classifiers by sequentially applying the weak classifiers from the first classifier to each of the partial images; and judging each of the partial images being an image of the predetermined object corresponding to one of the scores extracted according to the combined vector in the case where the score exceeds a predetermined threshold value.

11. The computer-readable medium according to claim 10, wherein the weak classifiers have been selected from a plurality of weak classifiers according to a method of learning by boosting.

12. The computer-readable medium according to claim 11, wherein the weak classifiers are connected in order determined according to the method of learning by boosting.

* * * * *